Figure 1:
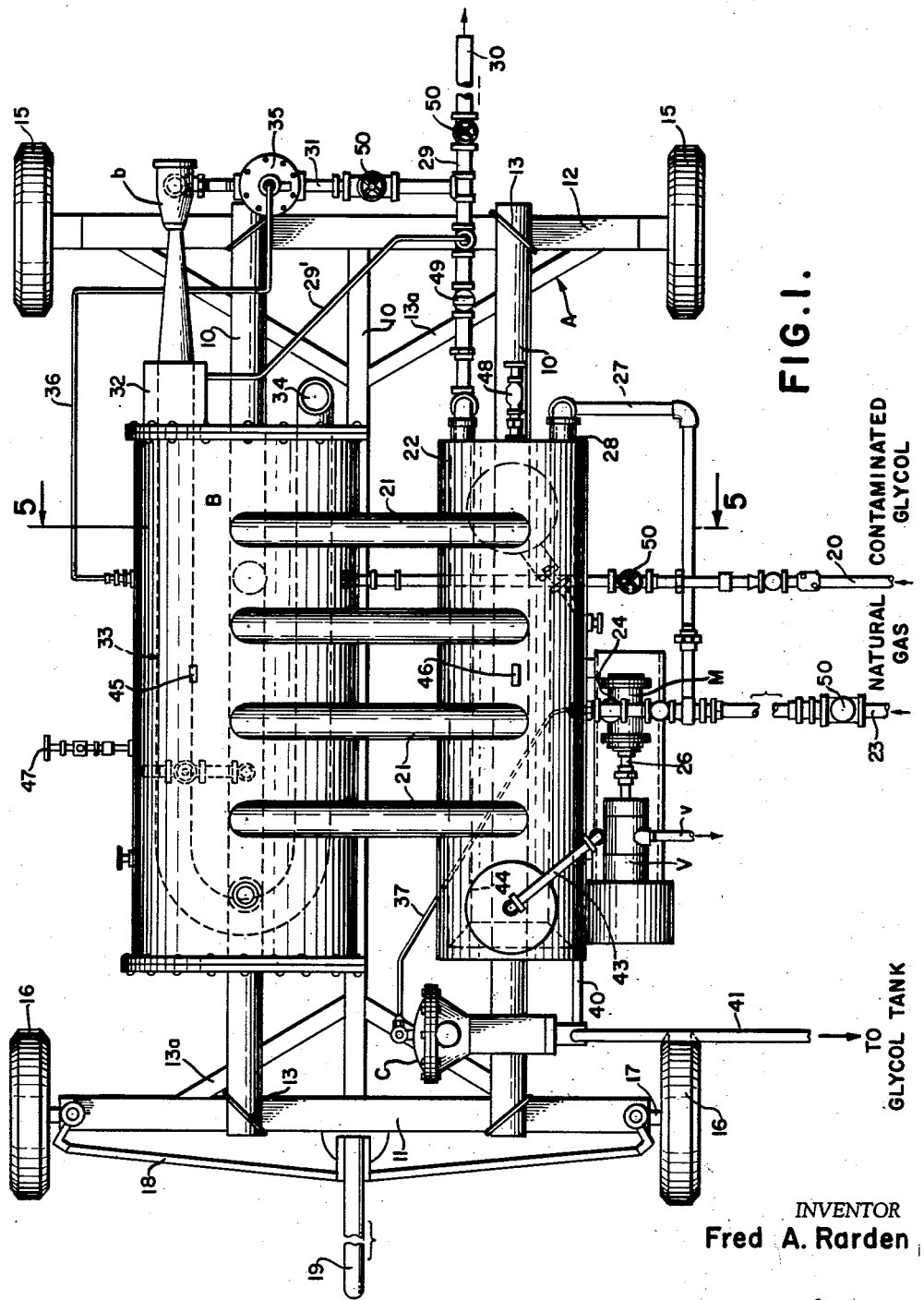

Dec. 8, 1964

F. A. RARDEN 3,160,572

VACUUM DISTILLATION APPARATUS UTILIZING
NATURAL GAS AS A COOLANT, FUEL
AND MOTIVE FORCE

Filed July 29, 1960

4 Sheets-Sheet 1

FIG.I.

INVENTOR
Fred A. Rarden

BY John A. Mawhinney

ATTORNEY

Dec. 8, 1964 F. A. RARDEN 3,160,572
VACUUM DISTILLATION APPARATUS UTILIZING
NATURAL GAS AS A COOLANT, FUEL
AND MOTIVE FORCE
Filed July 29, 1960 4 Sheets-Sheet 3

INVENTOR
Fred A. Rarden

BY John A. Mawhinney
ATTORNEY

Dec. 8, 1964 F. A. RARDEN 3,160,572
VACUUM DISTILLATION APPARATUS UTILIZING
NATURAL GAS AS A COOLANT, FUEL
AND MOTIVE FORCE
Filed July 29, 1960 4 Sheets-Sheet 4

INVENTOR
Fred A. Rarden

BY John A. Mawhinney
ATTORNEY 3,160,572
VACUUM DISTILLATION APPARATUS UTILIZING NATURAL GAS AS A COOLANT, FUEL AND MOTIVE FORCE
Fred A. Rarden, P.O. Box 424, McCamey, Tex., assignor, by mesne assignments, of fifty percent to Triangle Painting Service, Hobbs, N. Mex., a co-partnership composed of Don H. Wilson and C. W. Owen
Filed July 29, 1960, Ser. No. 46,126
7 Claims. (Cl. 202—182)

This invention relates to a vacuum distillation unit designed primarily for use in reclaiming glycol, either diethylene or triethylene, such as is employed in package type glycol dehydration units to filter or remove contaminants, and particularly water, from natural gas.

A prime object in attaining the end stated is to effect the reclamation or removal of the contaminants through vacuum distillation since the contaminating foreign matter has a higher boiling point than glycol.

An important aim is to produce such a unit which receives solely from natural gas its power, fuel and cooling, resulting in a unit so simplified that a one man operation is attained and dependence upon the practically always inaccessible operating supplies of electricity, steam or water at dehydration units is avoided.

A further object is to provide a readily portable or mobile unit designed for on-stream operation at any dehydration unit regardless of location and without requiring the shutting down of the associated dehydration unit and gas well.

Again, it is sought to provide such an apparatus wherein the procedure is carried out under vacuum conditions centering around vaporizing and condensing of the contaminated glycol.

With the foregoing and other objects in view, the invention will be more fully described hereinafter, and will be more particularly pointed out in the claims appended hereto.

Figure 2:
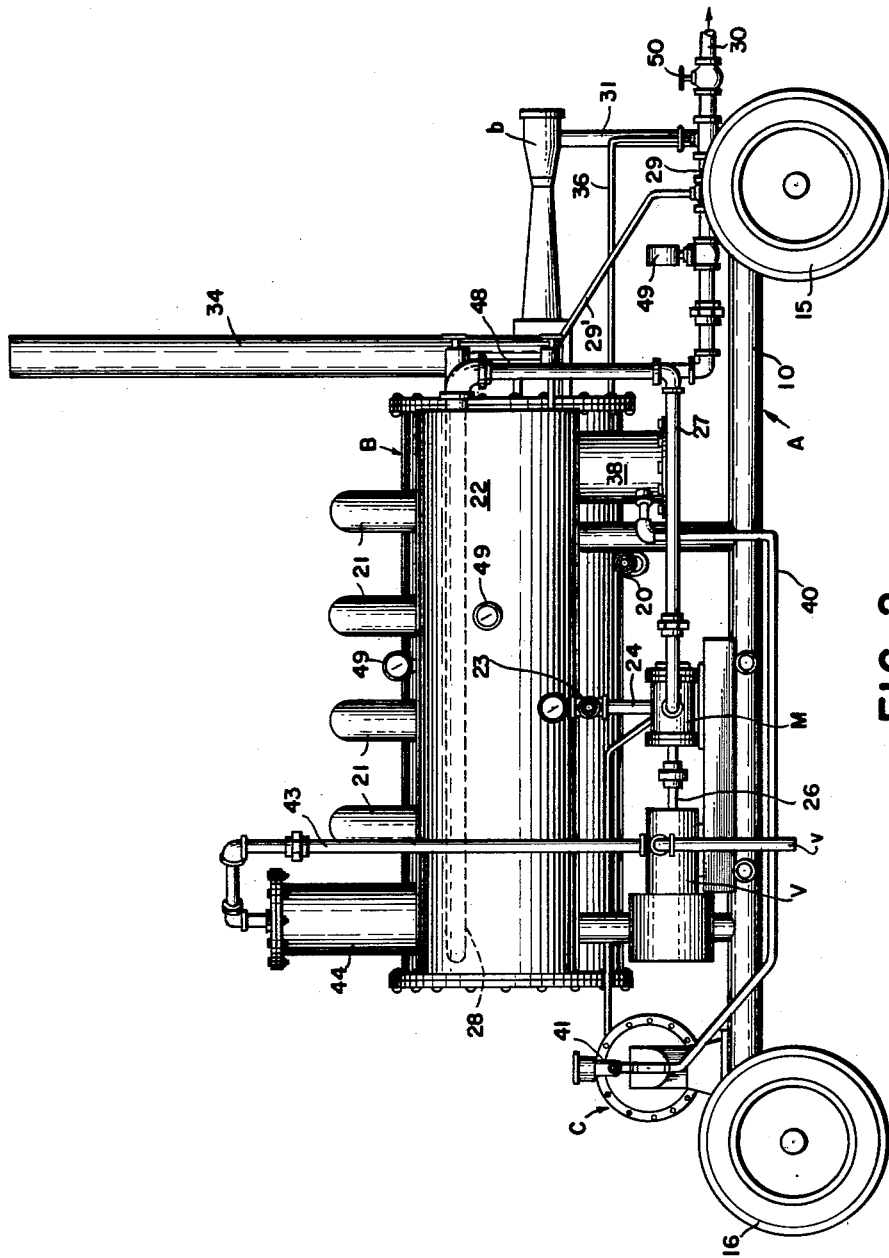
Figure 3:
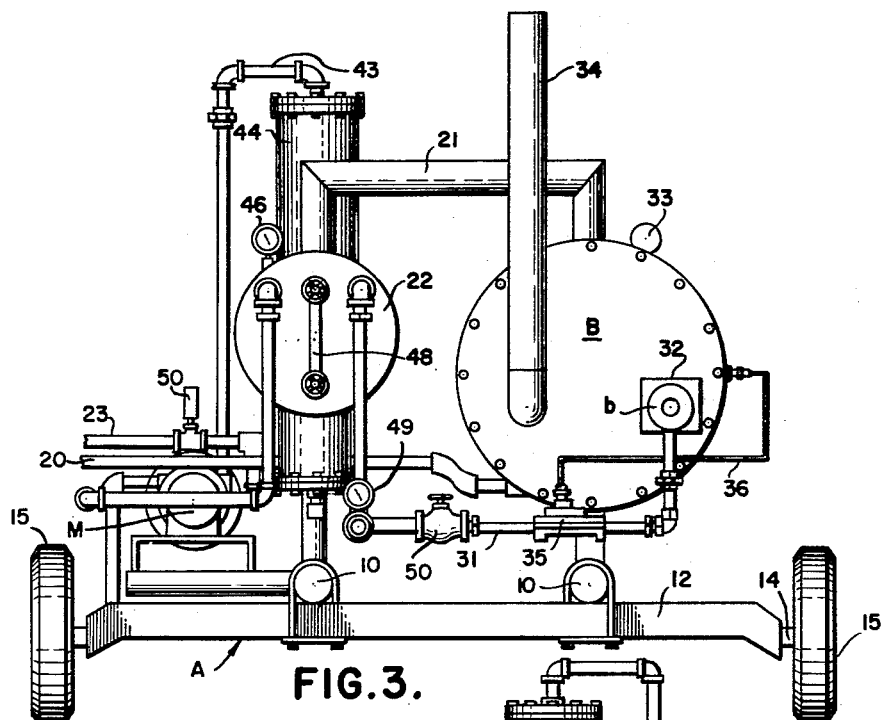
Figure 4:
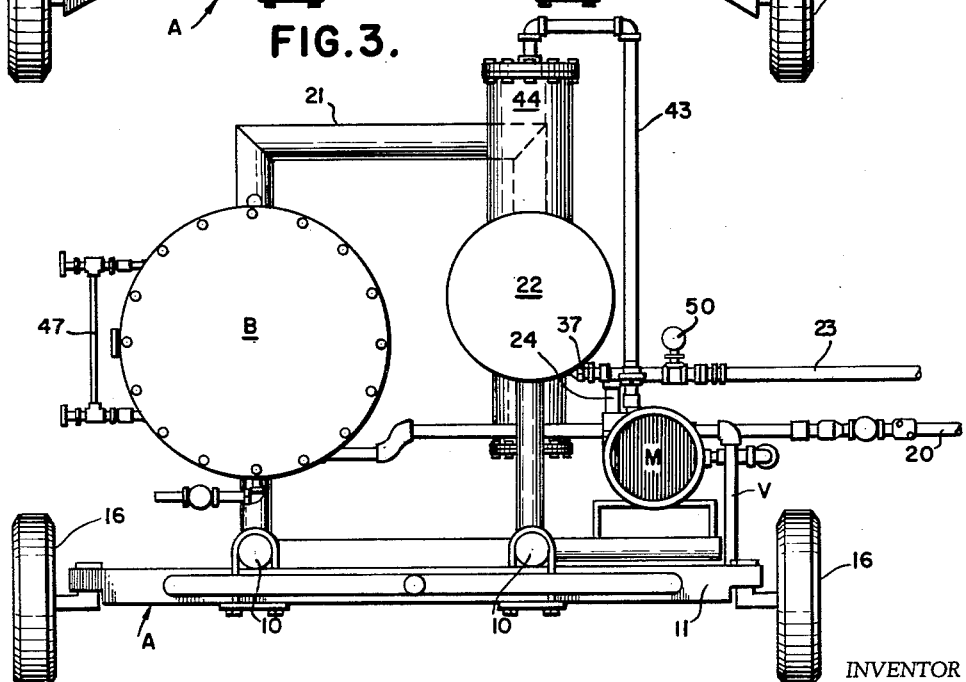
Figure 5:
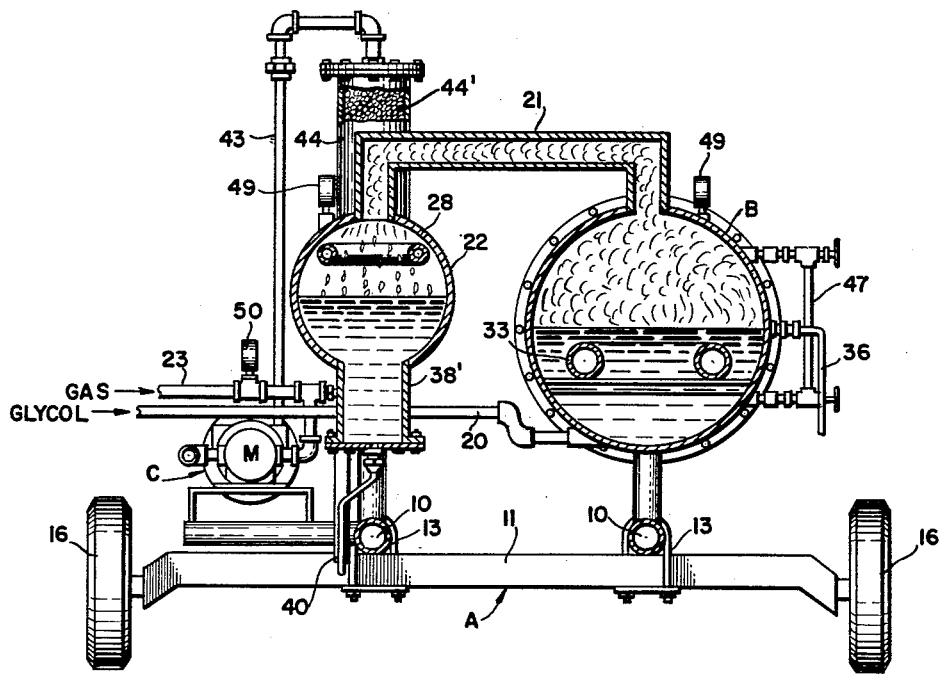
Figure 6:
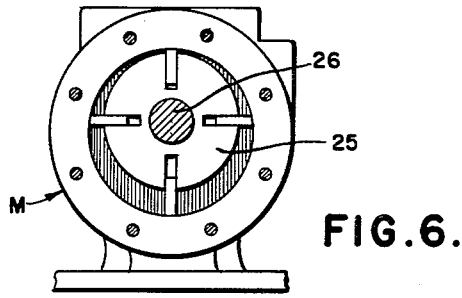
Figure 7:
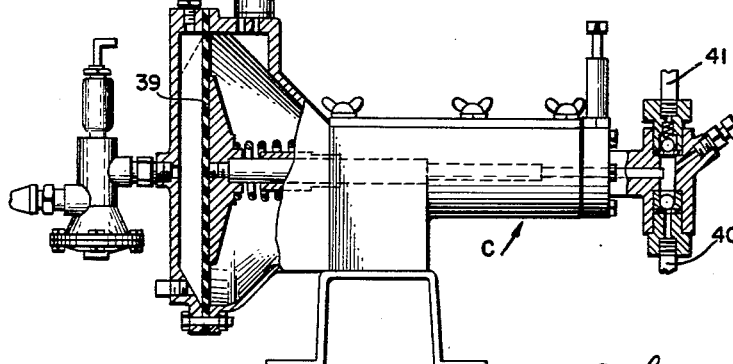

In the drawings, wherein like symbols refer to like or corresponding parts throughout the several views:

FIGURE 1 is a top plan view of the improved unit;
FIGURE 2 is a side elevation of said unit;
FIGURE 3 is a rear end elevation of said unit;
FIGURE 4 is a front end elevation of said unit;
FIGURE 5 is a vertical cross-sectional view taken on the line 5—5 of FIGURE 1;
FIGURE 6 is a schematic side elevation, with one side plate removed, to expose the rotor of the rotary motor which drives the vacuum pump employed, and
FIGURE 7 is a schematic side elevation, partly broken away, of the return pump for reclaimed glycol.

Referring specifically to the drawings wherein references designate like or corresponding parts throughout the different views, a suitable trailer frame or chassis A mounts the operating parts. Such frame A may consist essentially of a suitable number of longitudinal beams 10 and transverse front and rear beams 11 and 12, respectively, rigidly connected together as at 13 and all braced with respect to each other at 13a.

Mounted on beam 12 is an axle 14 on which wheels 15 are journaled. Wheels 16 are journaled on axles 17 in turn steerably journaled on vertical axes on beam 11 and operatively connected by a steering rod 18 from which a draft tongue 19 extends for coupling to a tractor or other suitable draft means to facilitate movement from one dehydration unit or equivalent to the others in the field as required.

Briefly, the glycol-reclaiming operation is carried out under vacuum produced by a pump V. Contaminated glycol, either diethylene or triethylene, is sucked from a dehydration unit (not shown) located at a well head through piping 20 into a boiler B wherein the contaminated glycol is vaporized. The glycol vapors rise in boiler B and exit through transverse conduits 21 into a condenser or tank 22, and the thus reclaimed glycol as a liquid returns from tank 22 to the said dehydration unit or other place of re-use or storage. All energy for operation of the parts involved is derived solely from the pressure of the natural gas, which gas is always available at the well, the same being pumped from the supply at the well through piping 23 and distributed thereby to perform various functions, that is, to drive a motor M which actuates said vacuum pump, to cool condenser 22 to supply a burner $b$ to heat the boiler B and to operate a return pump C which draws the reclaimed glycol from the vacuum in the condenser 22 and returns it to the desired point for re-use.

More in detail, a stream of natural gas at its well or a controlled temperature and pressure passes into piping 23 and through its down-branch 24 into and continuously or controllably drives motor M, which motor may be of any suitable type and, for instance, rotary as suggested in FIGURE 6, the vaned rotary piston thereof being designated 25 and mounted on a rotary shaft 26 which extends exteriorly to the vacuum pump V which is also of any suitable type and for instance rotary, to drive such pump V which pulls a vacuum on boiler B and condenser 22 and, in fact, a vacuum throughout the path which the glycol takes through the apparatus or unit.

The stream of natural gas after driving motor M exhausts into piping 27 which is extended as a hollow U 28, for greater cooling action by such stream, and which U is disposed horizontally in condenser tank 22 and then continued outside of said tank 22 as a section 29 to any desired location for unobjectionable discharge at its terminal, designated 30.

From piping section 29 inwardly of its terminal 30, branch piping 31 delivers a portion of the stream of natural gas to a suitable heating means for boiler B shown as the previously mentioned burner $b$, and associated fire box 32 and a flue through which the products of combustion pass, shown as a U-shaped portion 33 disposed horizontally and longitudinally within the boiler and as a vertical stack 34 located outside of the boiler to discharge the products of combustion into the atmosphere.

An appropriate temperature control mechanism for burner $b$ may comprise, for example, a diaphragm valve device 35 coupled in branch piping 31 which is operable through the medium of heat-sensitive means including tubing 36 coupled thereto and to the boiler B and extending interiorly of the latter. Tubing 29' for conducting a pilot supply of gas to the fire box leads from piping 29.

At this point it is to be borne in mind too that branch piping or tubing 37, as shown in FIGURES 1 and 2, diverts natural gas from down-branch 24 to the previously mentioned return pump C for the reclaimed glycol, as will hereinafter better appear.

With more particularity to the path followed by the contaminated glycol and the parts more directly pertaining to the reclaiming procedure, such contaminated glycol as previously stated is pumped through piping 20 into boiler B, vaporizing therein, the water and other contaminants boiling off or the sediment remaining therein being removed in any suitable way or by any appropriate means as desired, with the glycol vapors passing through the transverse conduits 21 into condenser 22, the condensing or cooling action of which is aided by the inherent low temperature of the stream of natural gas passing through U 28.

Tank 22 has a sump 38 from which the condensate which is reclaimed glycol, through the action of said pump C at its end opposite diaphragm 39, leaves through piping 40 and thence through piping 41 which returns the reclaimed liquid glycol to the desired gas well head, place of storage or equivalent, for re-use.

The various parts are suitably mounted and supported on the trailer frame or chassis A in any desired way specifically forming no part of my invention.

Said vacuum motor M may exhaust in any suitable way and at any desired location as into the atmosphere through piping $v$. It should be mentioned too that the vacuum pull by said pump V may be through piping 43 communicating with said pump V and a chest 44 rising from the condenser 22, said chest being of a type which prevents the sucking out of glycol vapors, and for instance one containing saddle pack ceramics 44'.

It is to be understood that various controls may be employed for regulation of the parts and procedure according to the instant invention, such as maintaining the proper temperatures and pressures, for instance, and obviously such as vacuum gauges 45 and 46 and liquid level gauges 47 and 48 for the boiler B and condenser 22, respectively, and various pressure gauges 49 and regulating cut-off valves 50 in the various parts as shown and otherwise.

Presuming use, the unit being portable and mobile may be disposed at any of the various well heads encountered in an oil field and piping 20 connected at a well head to receive contaminated glycol therefrom while the piping 23 is connected with natural gas at the same well head, receiving such natural gas in a stream at the temperature and pressure at which it is released at the well or at a modified temperature or pressure as circumstances warrant.

The stream of natural gas passes through motor M and accordingly drives vacuum pump V which pulls a vacuum directly at the chest 44 and hence on the condenser 22 and boiler B and, in fact, throughout the path to be taken by both the contaminated and the reclaimed glycol. After passage through the motor M, the stream of natural gas serves as a coolant for the condenser, passing through piping 27, its U 28 and piping 29, any excess discharging at 30 into the atmosphere.

From the piping 29, natural gas passes to the burner $b$ through piping 31 and a pilot source of natural gas passes through the tube 29' to the fire box 32. The boiler is heated with appropriate control by the products of combustion passing from the burner through the U-shaped flue 33 which escape into the atmosphere through stack 34. A portion of the stream of natural gas entering the pipe 23 is diverted from the down-branch 24 through tubing 37 into pump C and hence the latter is operated. Thus the contaminated glycol in boiler B is vaporized, the vapors rising and passing through the conduits or ducts 21 into the condenser 22, condensing therein with the condensate, which is reclaimed glycol being pumped by said pump C from such condenser at sump 38 through piping or tubing 40 and 41 and hence returned to the glycol tank at the well head or otherwise for re-use.

Although I have disclosed herein the best form of the invention known to me at this time, I reserve the right to all such modifications and changes as may come within the scope of the following claims.

What I claim is:
1. Apparatus of the class described for reclaiming glycol comprising a boiler to receive contaminated glycol, heating means for said boiler, a condenser in communication with said boiler to receive glycol vapors therefrom, a pump connected directly to the condenser to pull a vacuum on said boiler through said condenser, means operable by natural gas under pressure to drive said pump, and piping to receive the natural gas after driving said pump to conduct it as a coolant about said condenser and thence to said heating means as the fuel for the latter.

2. Apparatus for reclaiming glycol according to claim 1 in which the connection between the vacuum pump and the condenser includes means for preventing sucking out of glycol vapors.

3. Apparatus for reclaiming glycol according to claim 1 in which there is provided a natural gas pressure-driven motor in driving relation to said pump, conduit means for detachable connection directly to a source of natural gas under pressure and for connecting the source of natural gas in series to the motor, then to the condenser and then to the heating means, a pilot for the heating means is provided and the means for connecting the source of natural gas to the motor, condenser and heating means also connects the source of natural gas to said pilot.

4. Apparatus of the class described for reclaiming glycol comprising
 (a) distilling means into which contaminated glycol is supplied,
 (b) a condenser communicating therewith to receive the distilled glycol therefrom,
 (c) means for creating a vacuum in said distilling means and condenser,
 (d) a pump mechanism in glycol-withdrawing relation to said condenser,
 (e) heating means for said distilling means, and
 (f) means to supply a stream of natural gas under pressure from a well head in series to said pump mechanism then into cooling relation to said condenser and then to said heating means as its fuel.

5. Apparatus of the class described for reclaiming glycol comprising:
 (a) a boiler to receive contaminated glycol,
 (b) heating means for said boiler,
 (c) a condenser in communication with said boiler to receive glycol vapors therefrom,
 (d) a pump connected directly to the condenser to pull a vacuum on said boiler through said condenser,
 (e) a natural gas pressure-driven motor in driving relation to said pump,
 (f) conduit means for detachable connection directly to a source of natural gas under pressure,
 (g) a natural gas pressure operated pump to pump the reclaimed glycol from the condenser for reuse,
 (h) means for connecting said conduit means in series to the motor, then to the condenser and then to the heating means, and
 (i) means for conducting some of the natural gas from the motor to said second-mentioned pump.

6. Apparatus of the class described for reclaiming glycol comprising:
 (a) a boiler to receive contaminated glycol,
 (b) heating means for said boiler,
 (c) a condenser in communication with said boiler to receive glycol vapors therefrom,
 (d) a pump connected directly to the condenser to pull a vacuum on said boiler through said condenser,
 (e) a natural gas pressure driven motor in driving relation to said pump,
 (f) conduit means for detachable connection directly to a source of natural gas under pressure and
 (g) means for connecting said conduit means in series to said motor, then to the condenser and then to the heating means.

7. Apparatus of the class described for reclaiming glycol comprising:
(a) a boiler to receive contaminated glycol,
(b) heating means for said boiler,
(c) a condenser in communication with said boiler to receive glycol vapors therefrom,
(d) a pump connected directly to the condenser to pull a vacuum on said boiler through said condenser,
(e) a natural gas pressure driven motor in driving relation to said pump,
(f) piping connecting a source of natural gas under pressure to said motor,
(g) additional piping connecting the exhaust of said motor through said condensed to cool same, and
(h) further piping conducting the natural gas from the condenser to the heating means for the boiler.

References Cited in the file of this patent
UNITED STATES PATENTS

| | | |
|---|---|---|
| 1,089,831 | Gasser | Mar. 10, 1914 |
| 1,554,869 | McAndrews | Sept. 22, 1925 |
| 2,795,538 | Ratte et al. | June 11, 1957 |